(12) United States Patent
Ito

(10) Patent No.: US 10,848,754 B2
(45) Date of Patent: Nov. 24, 2020

(54) CAMERA INPUT INTERFACE AND SEMICONDUCTOR DEVICE

(71) Applicants: Kabushiki Kaisha Toshiba, Tokyo (JP); Toshiba Electronic Devices & Storage Corporation, Tokyo (JP)

(72) Inventor: Yuichi Ito, Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 148 days.

(21) Appl. No.: 16/124,733

(22) Filed: Sep. 7, 2018

(65) Prior Publication Data

US 2019/0260983 A1 Aug. 22, 2019

(30) Foreign Application Priority Data

Feb. 16, 2018 (JP) .................................. 2018-026044

(51) Int. Cl.
| | |
|---|---|
| *H04N 5/225* | (2006.01) |
| *H04N 17/00* | (2006.01) |
| *H04N 5/232* | (2006.01) |
| *H04N 1/21* | (2006.01) |

(52) U.S. Cl.
CPC ......... *H04N 17/002* (2013.01); *H04N 1/2112* (2013.01); *H04N 5/232* (2013.01)

(58) Field of Classification Search
None
See application file for complete search history.

(56) References Cited

U.S. PATENT DOCUMENTS

| | | | | |
|---|---|---|---|---|
| 6,219,467 | B1* | 4/2001 | Uchida | .............. H04N 1/00002 382/309 |
| 2008/0101468 | A1 | 5/2008 | Ishikawa | |
| 2009/0147100 | A1* | 6/2009 | Nagamasa | .............. H04N 5/222 348/223.1 |
| 2010/0141823 | A1* | 6/2010 | Tsunekawa | ........... G06T 3/4053 348/333.12 |
| 2011/0311130 | A1* | 12/2011 | Ichimori | ................ G01C 11/06 382/154 |

(Continued)

FOREIGN PATENT DOCUMENTS

| | | |
|---|---|---|
| JP | 2008-99003 A | 4/2008 |
| JP | 2008-118297 A | 5/2008 |

(Continued)

*Primary Examiner* — Twyler L Haskins
*Assistant Examiner* — Dwight Alex C Tejano
(74) *Attorney, Agent, or Firm* — White & Case LLP

(57) ABSTRACT

According to one embodiment, a camera input interface includes a first channel processing circuit, a second channel processing circuit, a selector, and a comparator. The first channel processing circuit is configured to perform image processing to image data from the first input source. The second channel processing circuit is configured to perform image processing to image data from the first input source or the second input source. The selector is provided on an input side of the second channel processing circuit and configured to be switched to either one of the first input source and the second input source. The comparator is configured to compare a first output result output from the first channel processing circuit and a second output result output from the second channel processing circuit with each other.

14 Claims, 8 Drawing Sheets

(56) References Cited

U.S. PATENT DOCUMENTS

2016/0117831 A1* 4/2016 Nakashima ............. G06T 7/001
              382/154
2016/0301923 A1* 10/2016 Ichige .................. H04N 13/239
2018/0082138 A1    3/2018 Ito

FOREIGN PATENT DOCUMENTS

JP    2009-011546 A    1/2009
JP    2018-045560 A    3/2018

* cited by examiner

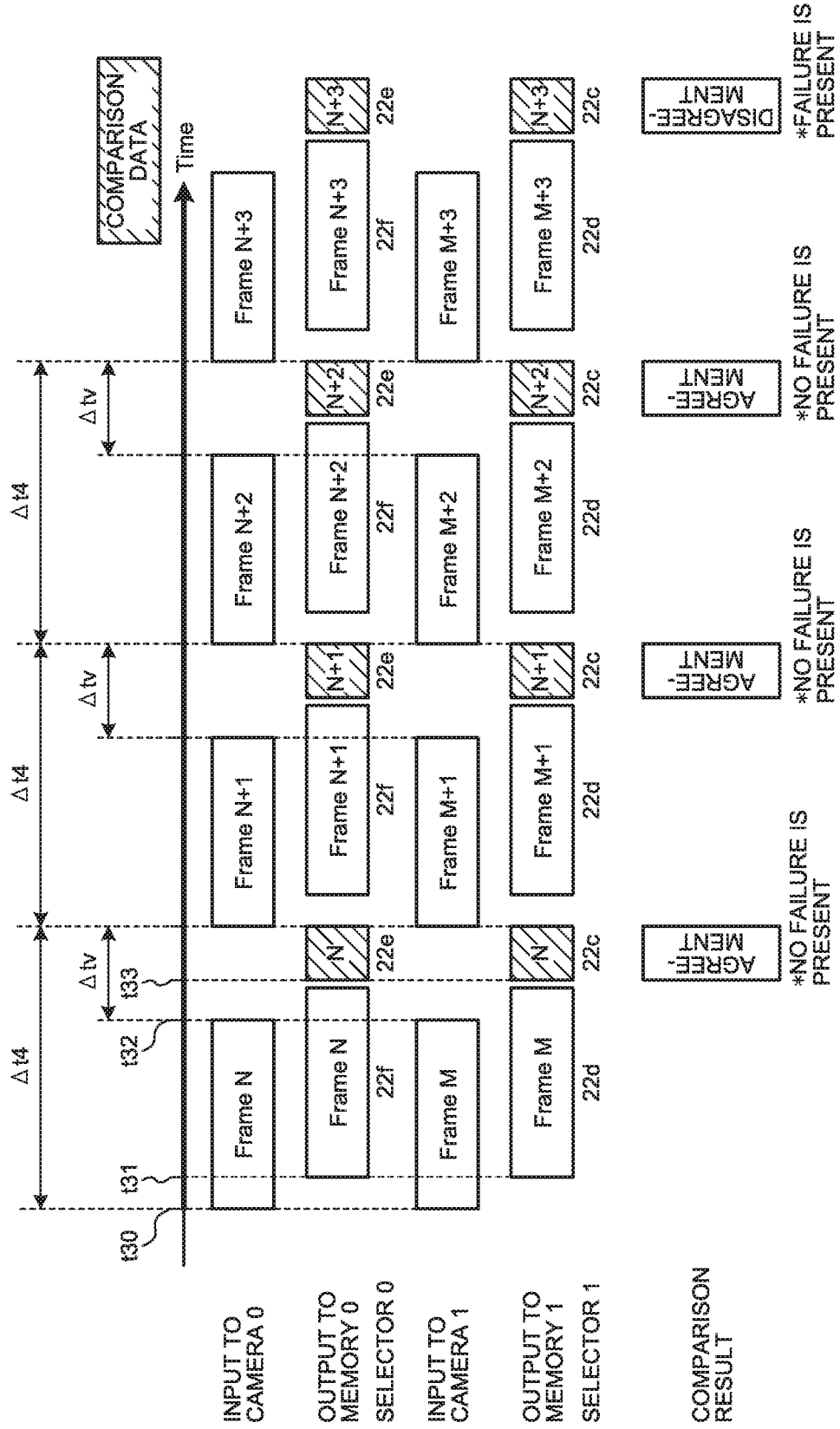

US 10,848,754 B2

CAMERA INPUT INTERFACE AND SEMICONDUCTOR DEVICE

CROSS-REFERENCE TO RELATED APPLICATIONS

This application is based upon and claims the benefit of priority from Japanese Patent Application No. 2018-026044, filed on Feb. 16, 2018; the entire contents of which are incorporated herein by reference.

FIELD

Embodiments described herein relate generally to a camera input interface and a semiconductor device.

BACKGROUND

Conventionally, an imaging device is known, which includes a processing circuit for processing image data picked up by an imaging element, and a failure detection circuit for performing failure detection to the processing circuit.

In an imaging device having a configuration of multiple input and multiple output, failure detection circuits are provided by corresponding to processing circuits. As a result, the circuit scale becomes larger, and, along with this, the power consumption also becomes larger. Further, if the circuit is made duplex for failure detection, the failure rate of the camera input interface ends up being doubled.

BRIEF DESCRIPTION OF THE DRAWING

FIG. 8 is a diagram illustrating an example of a timing chart in which camera inputs are captured by the camera input interface according to the third embodiment.

DETAILED DESCRIPTION

In general, according to one embodiment, a camera input interface processing image data input from a first input source and a second input source is provided. The camera input interface includes a first channel processing circuit, a second channel processing circuit, a selector, and a comparator. The first channel processing circuit is configured to perform image processing to first image data from the first input source. The second channel processing circuit is configured to perform image processing to the first image data from the first input source, or second image data from the second input source. The selector is provided on an input side of the second channel processing circuit and configured to be switched to either one of the first input source and the second input source. The comparator is configured to compare a first output result output from the first channel processing circuit and a second output result output from the second channel processing circuit with each other.

Exemplary embodiments of a camera input interface and a semiconductor device will be explained below in detail with reference to the accompanying drawings. The present invention is not limited to the following embodiments.

First Embodiment

Figure 1:
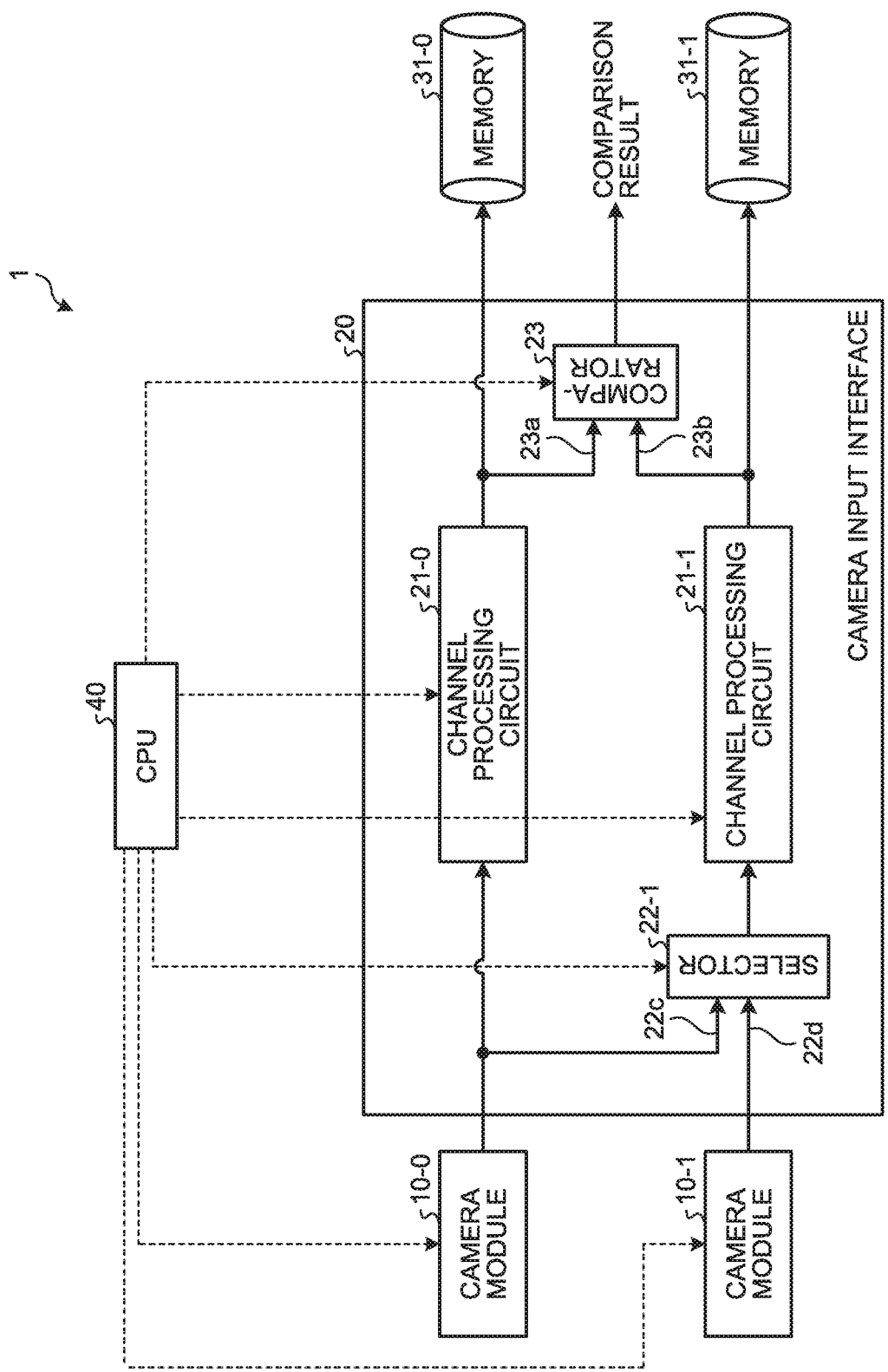
FIG. 1 is a block Diagram schematically illustrating a configuration example of a semiconductor device that includes a camera input interface according to a first embodiment.

FIG. 1 is a block diagram schematically illustrating a configuration example of a semiconductor device that includes a camera input interface according to a first embodiment. The semiconductor device 1 includes a plurality of camera modules 10-0 and 10-1, a camera input interface 20, memories 31-0 and 31-1, and a Central Processing Unit (CPU) 40.

Each of the camera modules 10-0 and 10-1 takes an image within an imaging area in a predetermined frame period, and outputs image data thus picked up to the camera input interface 20. Here, inputs of image data from the respective camera modules 10-0 and 10-1 to the camera input interface 20 are synchronized with each other. For example, in synchronization with a predetermined signal input from the camera input interface 20 side to the camera modules 10-0 and 10-1 side, the camera modules 10-0 and 10-1 output image data to the camera input interface 20 side. Each of the camera modules 10-0 and 10-1 has an imaging element, such as a Complementary Metal-Oxide-Semiconductor (CMOS) sensor, for example.

The memories 31-0 and 31-1 store image data output from respective channels of the camera input interface 20. Specifically, the memory 31-0 stores image data output from a channel processing circuit 21-0 described later. The memory 31-1 stores image data output from a channel processing circuit 21-1 described later. In this state, the memories 31-0 and 31-1 are provided by corresponding to the channels. Each of the memories 31-0 and 31-1 may be a volatile memory or may be a nonvolatile memory. For example, each of the memories 31-0 and 31-1 is formed of a Dynamic Random Access Memory (DRAM) or Static RAM (SRAM). Here, FIG. 1 illustrates a structure provided with the plurality of memories 31-0 and 31-1; however, the semiconductor device 1 may be provided with a memory that includes areas allocated to the respective channels.

The camera input interface 20 is a circuit connected to the camera modules 10-0 and 10-1 and configured to process image data from the camera modules 10-0 and 10-1. The camera input interface 20 includes a plurality of channels that can receive inputs from the plurality of camera modules 10-0 and 10-1. FIG. 1 illustrates a case where the camera input interface 20 includes two channels. The camera input interface 20 includes a plurality of channel processing circuits 21-0 and 21-1, a selector 22-1, and a comparator 23. Here, it is assumed that a route including the channel processing circuit 21-0 is a channel 0, and a route including the channel processing circuit 21-1 is a channel 1.

The channel processing circuits 21-0 and 21-1 perform image processing to image data input from the camera modules 10-0 and 10-1, and output the results to the memories 31-0 and 31-1, which are provided by corresponding to the respective channels, and further to the comparator 23. The image processing is exemplified by demosaic, gamma correction, color space conversion, scaling, white balance adjustment, High Dynamic Range (HDR) compression or expansion, brightness and contrast adjustment, and edge enhancement, for example.

Demosaic: to convert RAW format data, input from a camera, into RGB. The RAW format data is unprocessed image data taken by a camera or the like. Here, the image data is formed of data of a plurality of pixels. Further, data of pixels is composed of three color values, which are values of red, green, and blue, specifically. These values of red, green, and blue are called "RGB".

Gamma correction: to adjust the gradation of an image.

Color space conversion: to convert the color space of an image. For example, this performs conversion, such as "RGB→YUV" or "YUV→RGB". Here, YUV stands for color space, in which Y denotes a luminance signal, U denotes a color difference signal (Cb), and V denotes a color difference signal (Cr).

Scaling: to magnify or reduce an image.

White balance adjustment: to adjust the white balance of an image.

HDR compression or expansion: to perform HDR compression or HDR expansion to image data.

Brightness and contrast adjustment: to adjust the luminance and contrast of an image.

Edge enhancement: to enhance the edge of an image.

Each of the channel processing circuits 21-0 and 21-1 includes one or more image processing circuits, which have been selected from the image processing circuits for executing image processing listed above.

The respective channel processing circuits 21-0 and 21-1 include at least one or more image processing circuits the same as each other so that the same image processing can be performed in the respective channels at the time of performing failure detection. As an example of such an arrangement, there may be a case where the respective channel processing circuits 21-0 and 21-1 include entirely the same image processing circuits as each other, as a whole. Further, there may be a case where the channel processing circuit 21-0 includes an image processing circuit A, an image processing circuit B, and an image processing circuit C, while the channel processing circuit 21-1 includes the image processing circuit A and the image processing circuit B. As in this case, if the image processing circuit C of the channel processing circuit 21-0 can be disabled at the time of performing failure detection, the respective channel processing circuits 21-0 and 21-1 may include different image processing circuits from each other.

The selector 22-1 is provided on the input side of a channel processing circuit, other than either channel, for example. In the example of FIG. 1, the selector 22-1 is provided on the input side of the channel processing circuit 21-1. The selector 22-1 includes an input 22c from the camera module 10-0 side, and an input 22d from the camera module 10-1 side. The selector 22-1 performs switching to output either one of image data input from the input 22c and image data input from the input 22d, to the channel processing circuit 21-1.

The comparator 23 is provided on the output sides of the channel processing circuit 21-0 and the channel processing circuit 21-1. The output result of the channel processing circuit 21-0 is input through an input 23a, and the output result of the channel processing circuit 21-1 is input through an input 23b. At the time of performing failure detection, the comparator 23 compares the output result of the channel processing circuit 21-0 with the output result of the channel processing circuit 21-1, and determines whether these two output results agree to each other. Specifically, the comparator 23 compares pieces of image-processed data with each other, which have been obtained by performing image processing to the same image data under the same conditions in the respective channel processing circuits 21-0 and 21-1, and outputs the determination result to the CPU, for example. When the comparison result of the comparator 23 is agreement, the CPU 40 determines that no failure is present in the channel processing circuits 21-0 and 21-1. When the comparison result of the comparator 23 is disagreement, the CPU 40 determines that a failure is present in either one of the channel processing circuits 21-0 and 21-1.

The camera input interface 20 according to the first embodiment performs image processing for failure detection in a predetermined frame period among the frame periods of the camera, and performs normal image processing in the other frame periods.

In the regular frame period, upon reception of inputs of image data from the respective camera modules 10-0 and 10-1, the channel processing circuits 21-0 and 21-1 perform predetermined image processing, and then output image-processed data as output results to the respective memories 31-0 and 31-1. At this time, the inputs of the selector 22-1 are switched to select image data on the camera module 10-1 side, and the comparator 23 is not operated. In this case, the channel processing circuits 21-0 and 21-1 may be operated by using same image processing parameters as each other, or may be operated by using different image processing parameters from each other.

On the other hand, in the frame period for performing failure detection, the inputs of the selector 22-1 are switched to select image data on the camera module 10-0 side, and the channel processing circuit 21-0 and the channel processing circuit 21-1 are set with the same image processing parameters as each other to execute image processing. Here, if the two channel processing circuits 21-0 and 21-1 are different from each other in configuration of image processing circuits included therein, these circuits are set to enable only common image processing circuits. Further, the comparator 23 compares image-processed data from the channel processing circuit 21-0 with image-processed data from the channel processing circuit 21-1, and determines whether these two pieces of image-processed data agree with each other or disagree with each other.

Figure 2:
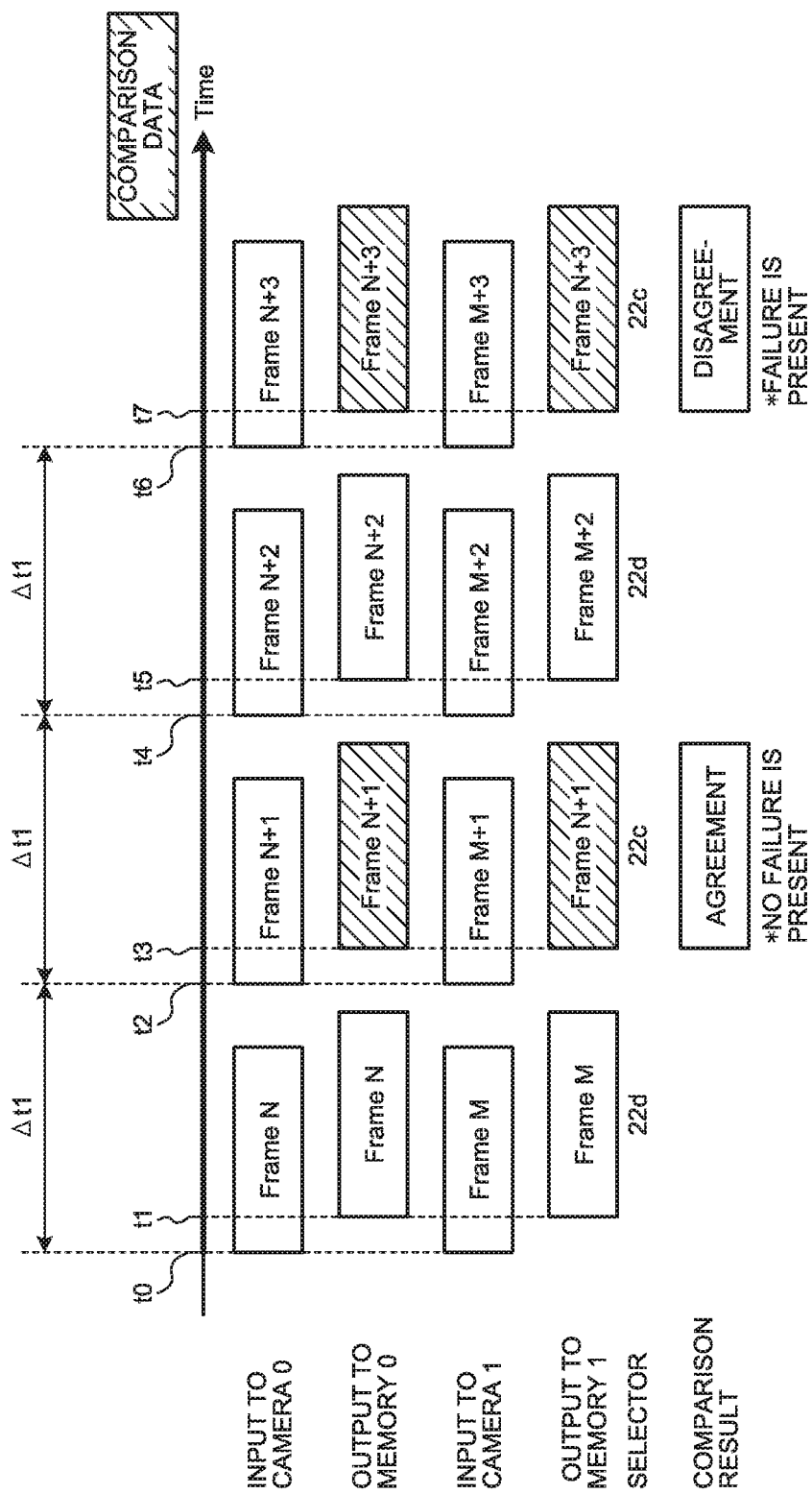
FIG. 2 is a diagram illustrating an example of a timing chart in which camera inputs are captured by the camera input interface according to the first embodiment.

FIG. 2 is a diagram illustrating an example of a timing chart in which camera inputs are captured by the camera input interface according to the first embodiment. In FIG. 2, the horizontal axis indicates time. FIG. 2 illustrates processing situations at "INPUT TO CAMERA 0", "OUTPUT TO MEMORY 0", "INPUT TO CAMERA 1", "OUTPUT TO MEMORY 1", "SELECTOR", and "COMPARISON RESULT". The INPUT TO CAMERA 0 represents image pickup timing in the camera module 10-0. The OUTPUT TO MEMORY 0 represents output timing of image-processed data from the channel processing circuit 21-0 to the memory 31-0. The INPUT TO CAMERA 1 represents image pickup timing in the camera module 10-1. The OUTPUT TO MEMORY 1 represents output timing of image-processed data from the channel processing circuit 21-1 to the memory 31-1. The SELECTOR represents an input selected by the selector 22-1. The COMPARISON RESULT represents a case where failure detection is performed in every other frame period.

At a time point t0, the camera modules 10-0 and 10-1 connected to the camera input interface 20 start picking up pieces of image data (frames) N and M, respectively, in synchronization with each other. At a subsequent time point t1, the channel processing circuit 21-0 processes the image data N, and outputs image-processed data to the memory 31-0. Further, the selector 22-1 is set to select the input 22*d* from the camera module 10-1, and thus the channel processing circuit 21-1 processes the image data M, and outputs image-processed data to the memory 31-1.

At a time point t2 after a lapse of a predetermined time Δt1 from the time point t0, the camera modules 10-0 and 10-1 starts picking up pieces of image data N+1 and M+1, respectively, in synchronization with each other. At this time, the selector 22-1 is set to select the input 22*c* from the camera module 10-0, and the respective channel processing circuits 21-0 and 21-1 are set with the same image processing parameters as each other to perform the same image processing. Consequently, at a time point t3, the channel processing circuit 21-0 starts the image processing to the image data N+1, and outputs image-processed data to the memory 31-0 and the comparator 23. Further, the channel processing circuit 21-1 starts the image processing to the image data N+1 from the camera module 10-0, and outputs image-processed data to the memory 31-1 and the comparator 23. The comparator 23 compares these two pieces of image-processed data with each other. Here, it is assumed that the comparator 23 has determined that the two pieces of image-processed data agree with each other. The comparator 23 outputs the comparison result indicating the agreement between the two pieces of image-processed data to the CPU 40, and the CPU 40 determines that no failure is present the channel processing circuits 21-0 and 21-1 of the respective channels of the camera input interface 20. In the way described above, the image processing for failure detection is performed in this frame period.

At a time point t4 after a lapse of the predetermined time Δt1 from the time point t2, the camera modules 10-0 and 10-1 starts picking up pieces of image data N+2 and M+2, respectively, in synchronization with each other. At a subsequent time point t5, the channel processing circuit 21-0 processes the image data N+2, and outputs image-processed data to the memory 31-0. Further, the selector 22-1 is set to select the input 22*d* from the camera module 10-1, and thus the channel processing circuit 21-1 processes the image data M+2, and outputs image-processed data to the memory 31-1.

At a time point t6 after a lapse of the predetermined time Δt1 from the time point t4, the camera modules 10-0 and 10-1 starts picking up pieces of image data N+3 and M+3, respectively, in synchronization with each other. At this time, the selector 22-1 is set to select the input 22*c* from the camera module 10-0, and the respective channel processing circuits 21-0 and 21-1 are set with the same image processing parameters as each other to perform the same image processing. Consequently, at a time point t7, the channel processing circuit 21-0 starts the image processing to the image data N+3, and outputs image-processed data to the memory 31-0 and the comparator 23. Further, the channel processing circuit 21-1 starts the image processing to the image data N+3 from the camera module 10-0, and outputs image-processed data to the memory 31-1 and the comparator 23. The comparator 23 compares these two pieces of image-processed data with each other. Here, it is assumed that the comparator 23 has determined that the two pieces of image-processed data disagree with each other. The comparator 23 outputs the comparison result indicating the disagreement between the two pieces of image-processed data to the CPU 40, and the CPU 40 determines that a failure is present in the channel processing circuits 21-0 and 21-1 of the camera input interface 20. Upon reception of this failure detection determination result, the user can try to recover the semiconductor device 1 by rebooting or the like. If the semiconductor device 1 cannot be recovered yet by this, the user may proceed to replacement or the like of the semiconductor device 1 including the camera input interface 20. In the way described above, the image processing for failure detection is performed in this frame period.

In the above description, a case is illustrated where there are two channels; however, the same is true in another multi-channel case where there are three or more channels. In this case, for example, a selector is provided on the input side of each second channel processing circuit other than a certain first channel processing circuit. This selector only needs to perform switching between an input from a camera module side corresponding to the second channel processing circuit provided with this selector, and an input from a camera module side corresponding to the first channel processing circuit.

Further, in order to create a frame period for performing failure detection, the frame rate may be increased. For example, where a camera module of 40 fps (frame period=25 ms) is used, in which four frames are processed in a time of 100 ms, the frame rate of the camera module may be increased to perform failure detection. For example, where camera module of 50 fps (frame period=20 ms) is used, a marginal time of one frame is created in a time of 100 ms, as compared with the camera module of 40 fps. Alternatively, where camera module of 60 fps (frame period=16.6 ms) is used, a marginal time of "two frames+α" is created in a time of 100 ms, as compared with the camera module of 40 fps. A marginal frame period created in this way can be used for failure detection processing.

Further, it may be arranged to perform the failure detection processing automatically by hardware including the channel processing circuits 21-0 and 21-1, the selector 22-1, and the comparator 23, on the basis of cyclic periods and image processing parameters preset in the hardware. In this case, for example, a vertical synchronizing signal or the like is used as a trigger to perform switching of the selector 22-1 and/or switching of setting of image processing parameters in the channel processing circuits 21-0 and 21-1. Alternatively, it may be arranged to perform the failure detection processing, on the basis of an instruction from software executed by the CPU 40.

Figure 3:
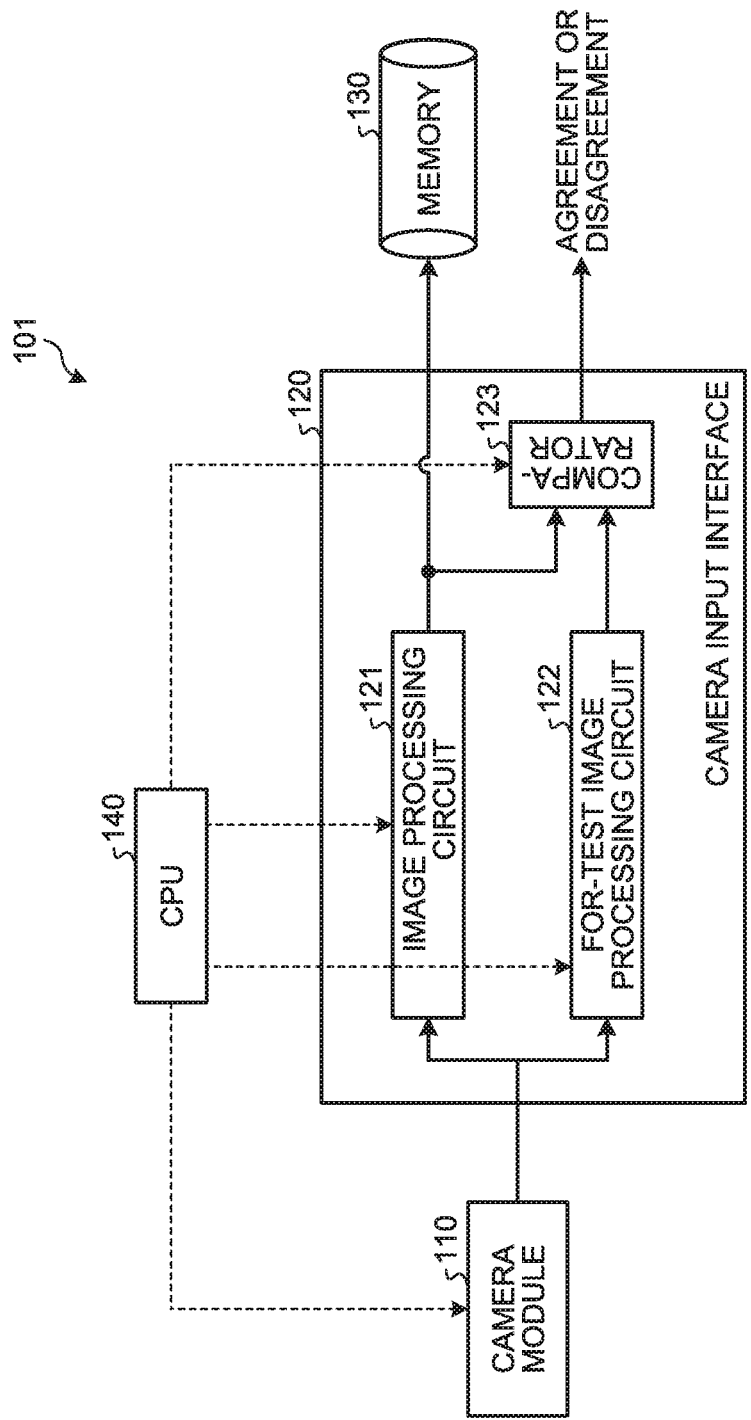
FIG. 3 is a block diagram illustrating a configuration example of a semiconductor device that includes a camera input interface according to a comparative example.

FIG. 3 is a block diagram illustrating a configuration example of a semiconductor device that includes a camera input interface according to a comparative example. The semiconductor device 101 according to the comparative example includes a camera input interface 120 for processing image data from a camera module 110, a memory 130 for storing image-processed data processed by the camera input interface 120, and a CPU 140 for controlling the camera module 110 and the camera input interface 120. The camera input interface 120 includes an image processing circuit 121 for performing image processing to image data taken by the camera module 110, a for-test image processing circuit 122 to be used for failure detection to the image processing circuit 121, and a comparator 123 for comparing image data from the image processing circuit 121 with image data from the for-test image processing circuit 122 at the time of performing failure detection.

In the frame periods other than a frame period for performing failure detection, the CPU 140 performs control to input image data taken by the camera module 110 to the image processing circuit 121, and to output image-processed data processed by the image processing circuit 121 to the memory 130.

In the frame period for performing failure detection, the CPU 140 performs control to input image data taken by the camera module 110 to the image processing circuit 121 and the for-test image processing circuit 122, and to output respective pieces of image-processed data processed by the image processing circuit 121 and the for-test image processing circuit 122 to the comparator 123, so that the comparator 123 compares these two pieces of image-processed data with each other.

In this configuration, as each channel needs to be provided with the for-test image processing circuit 122, the circuit scale becomes larger, and the power consumption also becomes larger. Further, as each channel includes the image processing circuit 121 and the for-test image processing circuit 122, the failure rate of the camera input interface 120 ends up being doubled.

On the other hand, in first embodiment, the camera input interface 20 includes the channel processing circuits 21-0 and 21-1 connected to the plurality of camera modules 10-0 and 10-1, the selector 22-1 provided on the input side of the channel processing circuit 21-1 and configured to switch acquisition sources of image data, and the comparator 23 provided on the output sides of the channel processing circuits 21-0 and 21-1. For example, at the time of performing failure detection, the selector 22-1 is switched to the input 22c, and thus image data from the camera module 10-0 is input to the channel processing circuits 21-0 and 21-1. Further, the channel processing circuits 21-0 and 21-1 are set with the same image processing parameters as each other, and the comparator 23 compares pieces of image-processed data output from the channel processing circuits 21-0 and 21-1 with each other. Specifically, according to the first embodiment, in the normal image processing, the plurality of channel processing circuits 21-0 and 21-1 perform image processing individually. However, in the image processing for failure detection, the plurality of channel processing circuits 21-0 and 21-1 are regarded as a multiplexed image processing circuit, and the respective channel processing circuits 21-0 and 21-1 perform image processing to the same image data under the same conditions. Consequently, as compared with the comparative example method in which the image processing circuit is simply made duplex for failure detection, this embodiment can perform failure detection to the image processing circuit substantially without changing the circuit scale, the power consumption, and the failure rate.

Second Embodiment

Figure 4:
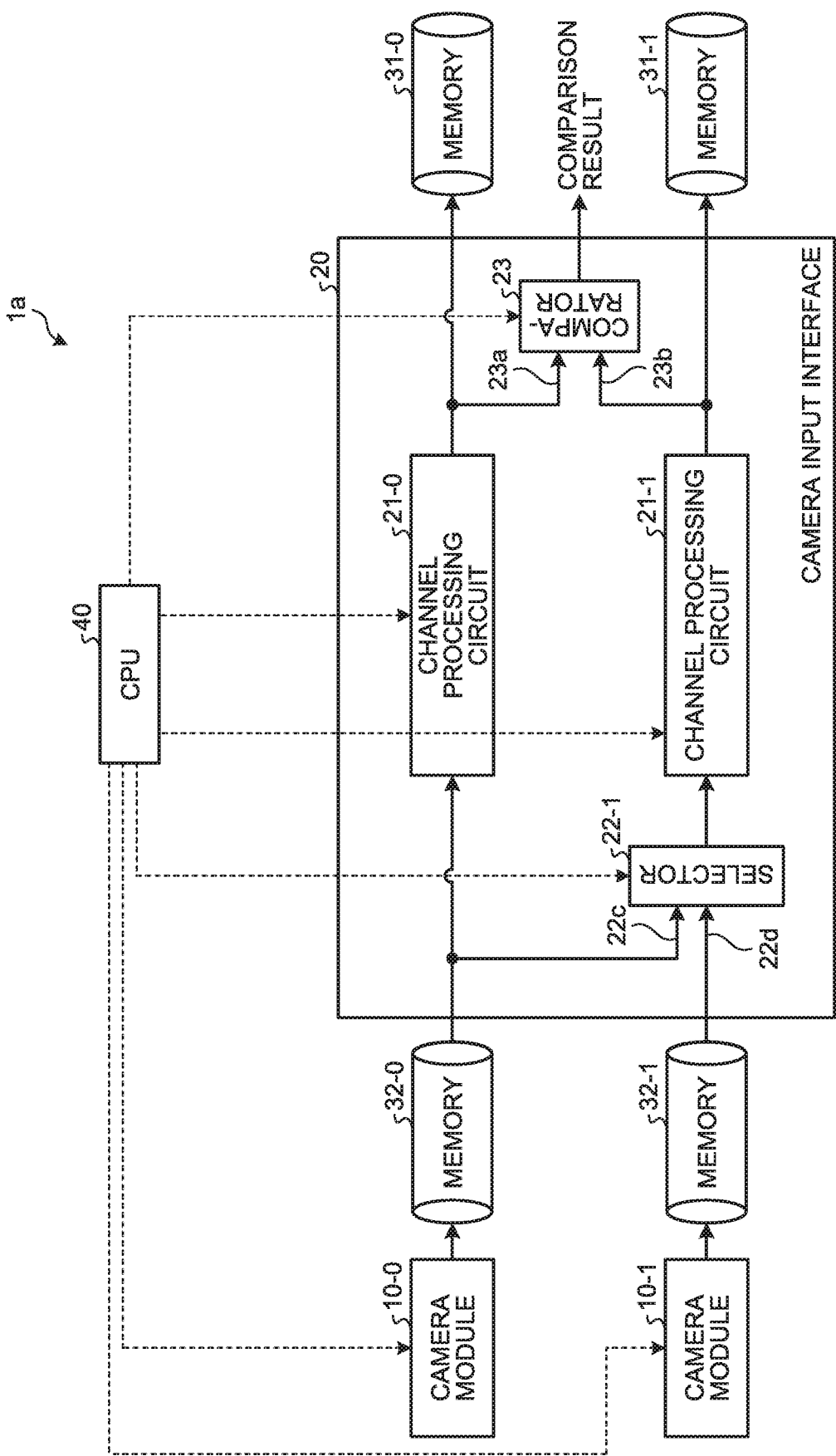
FIG. 4 is a block diagram illustrating a configuration example of a semiconductor device that includes a camera input interface according to a second embodiment.

FIG. 4 is a block diagram illustrating a configuration example of a semiconductor device that includes a camera input interface according to a second embodiment. In this semiconductor device 1a, memories 32-0 and 32-1 for buffering image data taken by the camera modules 10-0 and 10-1 are provided to the respective channels. For the sake of easy understanding of the configuration, FIG. 4 illustrates the memories 32-0 and 32-1 as being provided between the camera modules 10-0 and 10-1 and the channel processing circuits 21-0 and 21-1; however, in practice, the memories 32-0 and 32-1 are areas allocated inside a memory.

The channel processing circuits 21-0 and 21-1 read pieces of image data from the memories 32-0 and 32-1 and perform predetermined image processing. In the second embodiment, the clock frequency (operation cyclic period) of each of the channel processing circuits 21-0 and 21-1 is set larger than that of the first embodiment. More specifically, the clock frequency of each of the channel processing circuits 21-0 and 21-1 is set such that normal image processing and image processing for failure detection can be performed in one frame period.

The selector 22-1 performs switching so that the normal image processing and the image processing for failure detection can be performed in one frame period by the channel processing circuit 21-1. Here, the constituent elements corresponding to those described in the first embodiment are denoted by the same reference symbols, and their description will be omitted.

Figure 5:
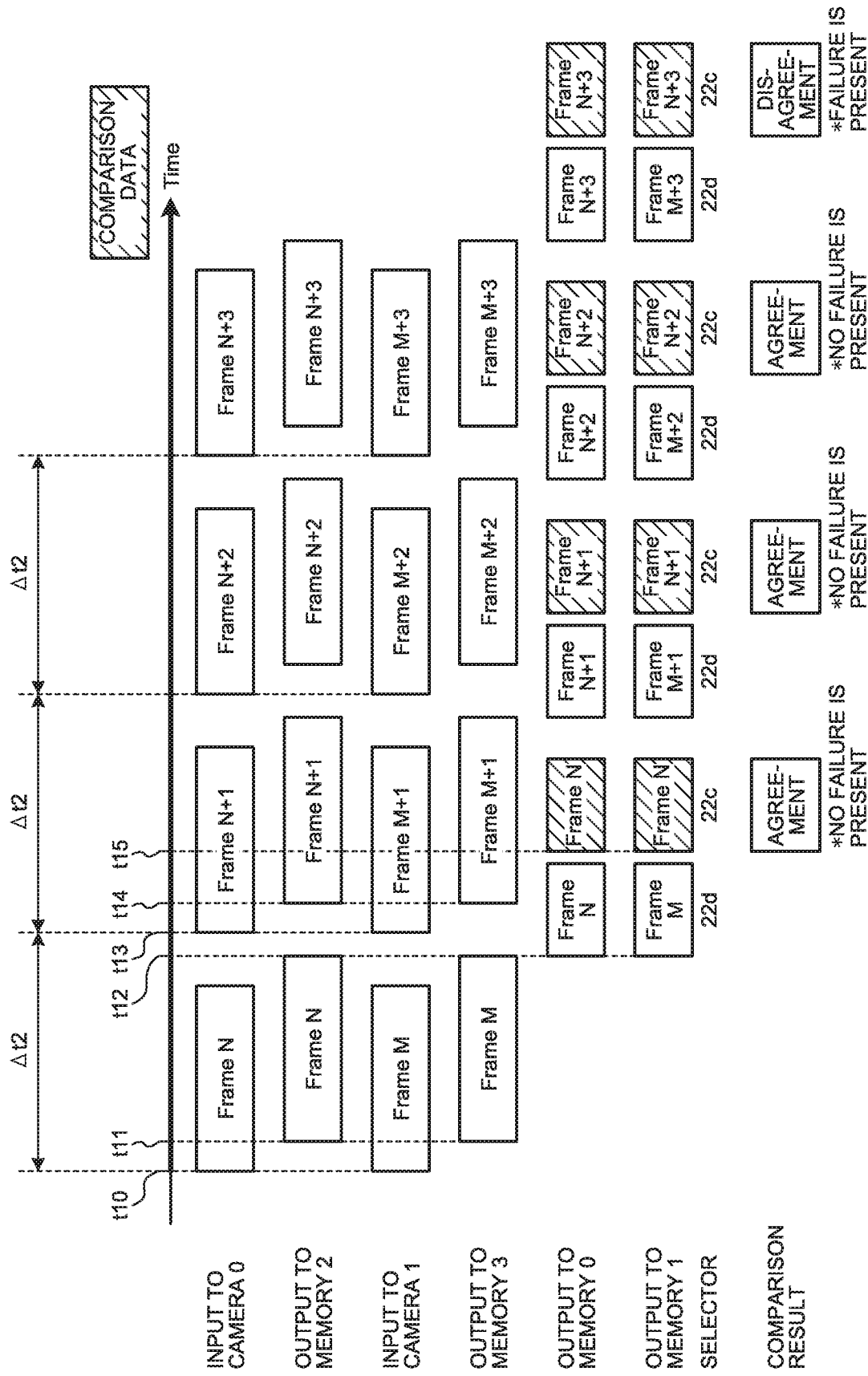
FIG. 5 is a diagram illustrating an example of a timing chart in which camera inputs are captured by the camera input interface according to the second embodiment.

FIG. 5 is a diagram illustrating an example of a timing chart in which camera inputs are captured by the camera input interface according to the second embodiment. In FIG. 5, the horizontal axis indicates time. FIG. 5 illustrates processing situations at "INPUT TO CAMERA 0", "OUTPUT TO MEMORY 2", "INPUT TO CAMERA 1", "OUTPUT TO MEMORY 3", "OUTPUT TO MEMORY 0", "OUTPUT TO MEMORY 1", "SELECTOR.", and "COMPARISON RESULT". The OUTPUT TO MEMORY 2 represents output timing of image data from the camera module 10-0 to the memory 32-0. The OUTPUT TO MEMORY 3 represents output timing of image data from the camera module 10-1 to the memory 32-1.

At a time point t10, the camera modules 10-0 and 10-1 connected to the camera input interface 20 start picking up pieces of image data N and M, respectively, in synchronization with each other. At a subsequent time point t11, the memory 32-0 starts storing the image data N taken by the camera module 10-0. Further, the memory 32-1 starts storing the image data M taken by the camera module 10-1.

At a time point t13 after a lapse of a predetermined time Δt2 from the time point t10, the camera modules 10-0 and 10-1 starts picking up pieces of image data N+1 and M+1, respectively, in synchronization with each other. At a subsequent time point t14, the memory 32-0 starts storing the image data N+1 taken by the camera module 10-0. Further, the memory 32-1 starts storing the image data M+1 taken by the camera module 10-1. In this way, processing of storing pieces of data picked up by the camera modules 10-0 and 10-1 respectively into the memories 32-0 and 32-1 is performed at every predetermined time Δt2.

On the other hand, at the time point t12 when the memories 32-0 and 32-1 have completed storing of the pieces of image data N and M, the selector 22-1 is set to select the input from the memory 32-1, and the respective channel processing circuits 21-0 and 21-1 are set with image processing parameters to perform normal image processing. Then, the channel processing circuit 21-0 reads the image data N from the memory 32-0, performs the normal image processing to the image data N, and outputs image-processed data N to the memory 31-0. Further, the channel processing circuit 21-1 reads the image data M from the memory 32-1, performs the normal image processing to the image data M, and outputs image-processed data M to the memory 31-1.

Thereafter, at a time point t15, the selector 22-1 is set to select the input from the memory 32-0, and the respective channel processing circuits 21-0 and 21-1 are set with the same image processing parameters for failure detection as each other. Then, the channel processing circuit 21-0 reads the image data N from the memory 32-0, performs image processing for failure detection to the image data N, and outputs image-processed data N to the memory 31-0 and the comparator 23. Further, the channel processing circuit 21-1 reads the image data N from the memory 32-0, performs image processing for failure detection to the image data N, and outputs image-processed data N to the memory 31-1 and the comparator 23. The comparator 23 compares these output results from the channel processing circuits 21-0 and 21-1 with each other, and determines whether the two output results agree with each other. Here, it is assumed that the comparator 23 has determined that the two output results agree with each other.

In the channel processing circuits 21-0 and 21-1, the normal image processing and the image processing for failure detection described above are executed at intervals of the predetermined time Δt2. In the example of FIG. 5, a case is illustrated such that, when the image data other than image data N+3 is subjected to failure detection, the image-processed data processed by the channel processing circuit 21-0 and the image-processed data processed by the channel processing circuit 21-1 agree with each other, and, when the image data N+3 is subjected to failure detection, these two pieces of image-processed data disagree with each other. Accordingly, after the failure detection processing is performed to the image data N+3, information is output that indicates presence of a failure in either one of the channel processing circuit 21-0 and the channel processing circuit 21-1.

In the first embodiment, the time necessary for image processing in the channel processing circuits 21-0 and 21-1 depends on the input rate from the camera modules 10-0 and 10-1. Specifically, the channel processing circuits 21-0 and 21-1 perform image processing by using a time almost the same as the time used for inputting image data from the camera modules 10-0 and 10-1. In contrast, in the second embodiment, since the memories 32-0 and 32-1 are used for buffering image data from the camera modules 10-0 and 10-1, the channel processing circuits 21-0 and 21-1 read image data from the memories 32-0 and 32-1, and can thereby execute image processing without depending on the input rate from the camera modules 10-0 and 10-1. Further, by increasing the image processing speed, a marginal time in one frame period can be used for failure detection processing. In this way, the camera input interface 20 according to the second embodiment can execute the normal image processing and the failure detection processing in each frame period.

Incidentally, in the method illustrated in FIG. 5 processing cannot be performed until pieces of image data taken by the camera modules 10-0 and 10-1 are stored respectively in the memories 32-0 and 32-1. Thus, the normal image processing and the failure detection processing come to be executed with a delay of one frame period. However, if part of image data (frame data) can be used to perform failure detection, the failure detection may be first performed, and then followed by the normal image processing. As the part of image data, for example, for-comparison image data in a predetermined range from the head of the image data can be used. The predetermined range may be exemplified by a specific number of lines from the head of the image data or a specific region from the head of the image data, for example.

Figure 6:
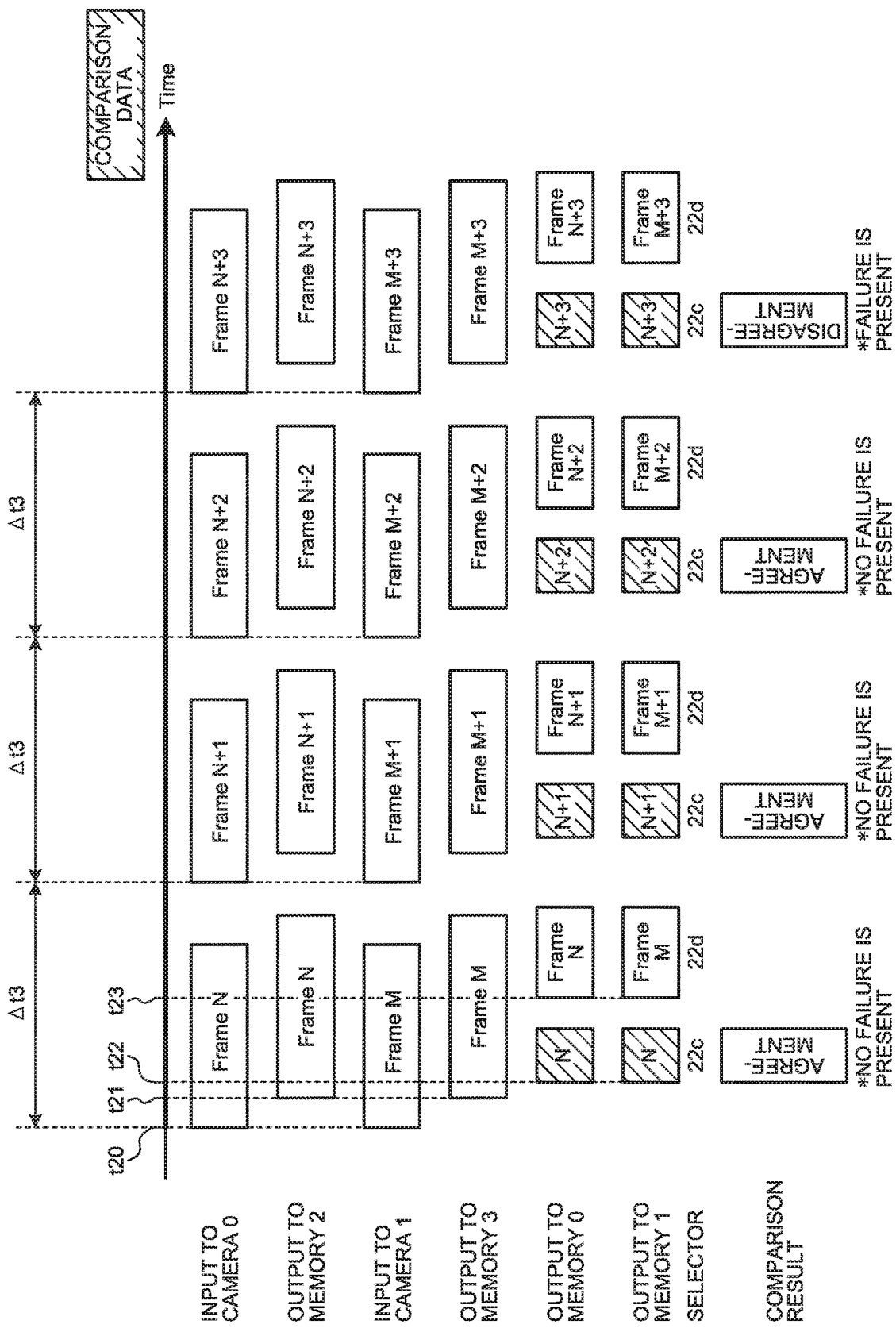
FIG. 6 is a diagram illustrating an example of a timing chart in which camera inputs are captured by the camera input interface according to the second embodiment.

FIG. 6 is a diagram illustrating an example of a timing chart in which camera inputs are captured by the camera input interface according to the second embodiment. In FIG. 6, the horizontal axis indicates time. FIG. 6 illustrates processing situations at "INPUT TO CAMERA 0", "OUTPUT TO MEMORY 2", "INPUT TO CAMERA 1", "OUTPUT TO MEMORY 3", "OUTPUT TO MEMORY 0", "OUTPUT TO MEMORY 1", "SELECTOR", and "COMPARISON RESULT".

At a time point t20, the camera modules 10-0 and 10-1 start picking up pieces of image data N and M, respectively, in synchronization with each other. Then, at a time point t21, the memory 32-0 starts storing the image data N taken by the camera module 10-0. Further, the memory 32-1 starts storing the image data M taken by the camera module 10-1.

Thereafter, at the time point t22 when the memory 32-0 has completed storing of for-comparison image data, which is image data of a specific number of lines, the selector 22-1 set to select the input from the memory 32-0, and the respective channel processing circuits 21-0 and 21-1 are set with the same image processing parameters for failure detection as each other. Then, the channel processing circuit 21-0 reads for-comparison image data N from the memory 32-0, performs image processing for failure detection to the for-comparison image data N, and outputs for-comparison image-processed data N to the memory 31-0 and the comparator 23. Further, the channel processing circuit 21-1 reads the for-comparison image data N from the memory 32-0, performs image processing for failure detection to the for-comparison image data N, and outputs for-comparison image-processed data N to the memory 31-1 and the comparator 23. The comparator 23 compares these two output results from the channel processing circuits 21-0 and 21-1 with each other, and determines whether the two output results agree with each other. Here, it is assumed that the comparator 23 has determined that the two output results agree with each other. Here, even after the time point t22, the memories 32-0 and 32-1 keep on storing the pieces of image data N and M from the camera modules 10-0 and 10-1, respectively.

Thereafter, at a time point t23, the selector 22-1 is set to select the input from the memory 32-1, and the respective channel processing circuits 21-0 and 21-1 are set with image processing parameters to perform normal image processing. Then, the channel processing circuit 21-0 reads the image data N from the memory 32-0, performs the normal image processing to the image data N, and outputs image-processed data N to the memory 31-0. Further, the channel processing circuit 21-1 reads the image data M from the memory 32-1, performs the normal image processing to the image data M, and outputs image-processed data M to the memory 31-1.

In the channel processing circuits 21-0 and 21-1, the normal image processing and the failure detection processing described above are executed at intervals of a predetermined time Δt3. In the example of FIG. 6, a case is illustrated such that, when the image data other than image data N+3 is subjected to failure detection, the for-comparison image-processed data output from the channel processing circuit 21-0 and the for-comparison image-processed data output from the channel processing circuit 21-1 agree with each other, and, when the image data N+3 is subjected to failure detection, these two pieces of for-comparison image-processed data disagree with each other. Accordingly, after the failure detection is performed to the image data N+3, information is output that indicates presence of a failure in the camera input interface 20.

As described above, as illustrated in FIG. 6, in the case where part of image data in a predetermined range is used as for-comparison image data, to execute failure detection processing, the channel processing circuits 21-0 and 21-1 can perform the failure detection processing with the timing when the memory 32-0 ends storing the for-comparison image data, and can perform the normal image processing thereafter. Consequently, in the case of FIG. 6, the normal image processing and the failure detection processing are executed with timing almost the same as the image pickup timing in the camera modules 10-0 and 10-1. On the other hand, in the case of FIG. 5, the normal image processing and the failure detection processing come to be executed with a delay of one frame period from the image pickup timing in the camera modules 10-0 and 10-1. As a result, as compared with the case of FIG. 5, the case of FIG. 6 makes it possible to reduce the output delay of the normal image processing to the memories 31-0 and 31-1.

In the above description, a case is illustrated where there are two channels; however, the same is true in another multi-channel case where there are three or more channels. In this case, for example, a selector is provided on the input side of each second channel processing circuit other than a certain first channel processing circuit. This selector only needs to perform switching between an input from a camera module side corresponding to the second channel processing circuit provided with this selector, and an input from a camera module side corresponding to the first channel processing circuit.

Also in the second embodiment, an effect substantially the same as that of the first embodiment can be obtained.

Third Embodiment

Figure 7:
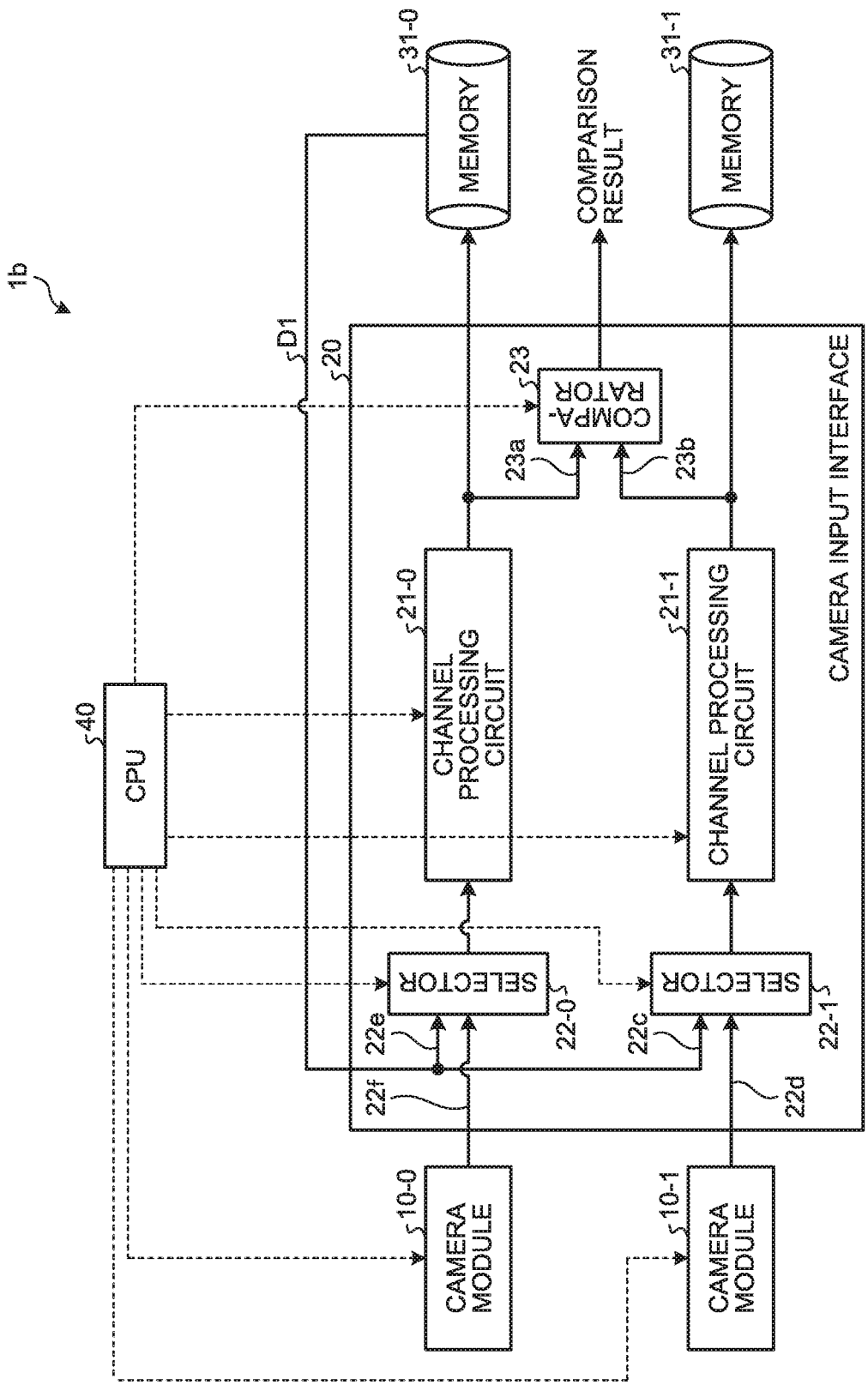
FIG. 7 is a block diagram illustrating a configuration example of a semiconductor device that includes a camera input interface according to a third example.

FIG. 7 is a block diagram illustrating a configuration example of a semiconductor device that includes a camera input interface according to a third example. In the semiconductor device 1 according to the first embodiment, the selector 22-1 is provided on the input side of the channel processing circuit 21-1. In the semiconductor device 1b according to the third embodiment, selectors 22-0 and 22-1 are provided on the input sides of the channel processing circuits 21-0 and 21-1, respectively. Here, each of the selectors 22-0 and 22-1 has a function of switching between an input from one of the camera modules 10-0 and 10-1 on the corresponding channel and an input from the memory 31-0.

The channel processing circuits 21-0 and 21-1 perform the failure detection processing by using a vertical blanking period after performance of the normal image processing. In the third embodiment, the start of the vertical blanking period is used as a trigger, and for-comparison image data in a predetermined range from the head of image data stored in the memory 31-0 is used to perform the failure detection processing. Accordingly, when the normal image processing is to be performed, the selector 22-0 is set to select an input 22f of image data from the camera module 10-0 side, and the selector 22-1 is set to select an input 22d of image data from the camera module 10-1 side. On the other hand, when the failure detection processing is to be performed, the selectors 22-0 and 22-1 are set to select inputs 22c and 22e from the memory 31-0. Here, the constituent elements corresponding to those described in the first embodiment are denoted by the same reference symbols, and their description will be omitted.

FIG. 8 is a diagram illustrating an example of a timing chart in which camera inputs are captured by the camera input interface according to the third embodiment. In FIG. 8, the horizontal axis indicates time. FIG. 8 illustrates processing situations at "INPUT TO CAMERA 0", "OUTPUT TO MEMORY 0", "SELECTOR 0", "INPUT TO CAMERA 1", "OUTPUT TO MEMORY 1", "SELECTOR 1", and "COMPARISON RESULT". The SELECTOR 0 represents an input selected by the selector 22-0. The SELECTOR 1 represents an input selected by the selector 22-1.

At a time point t30, the camera modules 10-0 and 10-1 start picking up pieces of image data N and M, respectively, in synchronization with each other. At a subsequent time point t31, the selector 22-0 is set to select the input 22f from the camera module 10-0, and the selector 22-1 is set to select the input 22d from the camera module 10-1. Then, the channel processing circuits 21-0 and 21-1 process the pieces of image data N and M thus taken, respectively, and output pieces of image-processed data N and N to the memories 31-0 and 31-1, respectively. This processing is repeatedly performed at a predetermined cyclic period Δt4.

A vertical blanking period Δtv is provided between the time point t32 when the camera modules 10-0 and 10-1 end taking image data and the time when the camera modules 10-0 and 10-1 start taking up the next image data. In the third embodiment, the channel processing circuits 21-0 and 21-1 perform the failure detection processing in this vertical blanking period Δtv. In this case, at a time point t33 after output of the pieces of image-processed data N and N, the selectors 22-0 and 22-1 are set to select the inputs 22e and 22c from the memory 31-0. Thereafter, the channel processing circuits 21-0 and 21-1 read for-comparison image data of the image data N from the memory 31-0, and execute image processing for failure detection thereto under the same image processing parameters as each other. The channel processing circuits 21-0 and 21-1 output pieces of for-comparison image-processed data to the memories 31-0 and 31-1, respectively. Then, the comparator 23 determines whether these two pieces of for-comparison image-processed data agree with each other. Then, for example, the CPU 40 performs failure detection by using the determination result from the comparator 23.

For example, after the channel processing circuit 21-0 performs normal image processing to the image data N, the selector 22-0 is switched to select the input 22e from the memory 31-0, and the channel processing circuit 21-0 is set with image processing parameters for failure detection. The channel processing circuit 21-0 reads for-comparison image data of the image data N from the memory 31-0, performs image processing for failure detection to the for-comparison image data, and outputs for-comparison image-processed data to the comparator 23 and the memory 31-0. Similarly, after the channel processing circuit 21-1 performs normal image processing to the image data N, the selector 22-1 is switched to select the input 22c from the memory 31-0, and the channel processing circuit 21-1 is set with the image processing parameters for failure detection. The channel processing circuit 21-1 reads the for-comparison image data of the image data N from the memory 31-0, performs image processing for failure detection to the for-comparison image data, and outputs for-comparison image-processed data to the comparator 23 and the memory 31-1. The comparator 23 compares the for-comparison image-processed data processed by the channel processing circuit 21-0 with the for-comparison image-processed data processed by the channel processing circuit 21-1, and determines whether these two pieces of for-comparison image-processed data agree with each other.

In the example of FIG. 8, a case is illustrated such that, when the image data other than image data N+3 is subjected to failure detection, the for-comparison image-processed data processed by the channel processing circuit 21-0 and the for-comparison image-processed data processed by the channel processing circuit 21-1 agree with each other, and, when the image data N+3 is subjected to failure detection, these two pieces of for-comparison image-processed data disagree with each other. Accordingly, after the failure detection is performed to the image data N+3, information is output that indicates presence of a failure in the camera input interface 20.

In the above description, a case is illustrated where there are two channels; however, the same is true in another multi-channel case where there are three or more channels. In this case, a selector is provided on the input side of every channel processing circuit. This selector only needs to perform switching between an input from a camera module side corresponding to the channel processing circuit provided with this selector, and an input from, for example, a memory corresponding to a certain channel processing circuit.

Also in the third embodiment, as effect substantially the same as that of the first embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes is the form of the embodiments described herein may be made without departing from the spirit of the inventions. The accompanying claims and their equivalents are intended to cover such forms or modifications as would fail within the scope and spirit of the inventions.

What is claimed is:

1. A camera input interface processing image data input from a first input source and a second input source, the camera input interface comprising:
   a first channel processing circuit configured to perform image processing to first image data from the first input source;
   a second channel processing circuit configured to perform image processing to the first image data from the first input source, or second image data from the second input source;
   a selector provided on an input side of the second channel processing circuit and configured to be switched to either one of the first input source and the second input source; and
   a comparator configured to compare a first output result output from the first channel processing circuit and a second output result output from the second channel processing circuit with each other, wherein
   the selector:
      selects a side for the second input source in a first frame period performing normal image processing; and
      selects a side for the first input source in a second frame period performing failure detection processing,
   the first channel processing circuit and the second channel processing circuit are preset to have timing to come into the first frame period and the second frame period, and is preset with an image processing parameter to be used in the first frame period and an image processing parameter to be used in the second frame period,
   the selector and the comparator are preset to have timing to come into the second frame period, and
   the first channel processing circuit, the second channel processing circuit, the selector, and the comparator perform switching between the first frame period and the second frame period in accordance with presetting.

2. The camera input interface according to claim 1, wherein,
   in the first frame period, the first channel processing circuit performs image processing to the first image data input from the first input source, and the second channel processing circuit performs image processing to the second image data input from the second input source, and,
   in the second frame period, the first channel processing circuit and the second channel processing circuit perform image processing to the first image data.

3. The camera input interface according to claim 2, wherein,
   in the first frame period, the first channel processing circuit and the second channel processing circuit are set with respective image processing parameters that are arbitrary with respect to each other, and,
   in the second frame period, the first channel processing circuit and the second channel processing circuit are set with respective image processing parameters that are same as each other.

4. The camera input interface according to claim 2, wherein, in the second frame period in which the selector selects the side for the first input source, the comparator compares the first output result and the second output result with each other, and outputs information about agreement or disagreement.

5. The camera input interface according to claim 1, further comprising a CPU configured to control operations of the first channel processing circuit, the second channel processing circuit, the selector, and the comparator,
   wherein the first channel processing circuit, the second channel processing circuit, the selector, and the comparator perform switching between the first frame period and the second frame period on a basis of an instruction from the CPU.

6. A semiconductor device comprising:
   a camera input interface processing image data input from a first input source and a second input source;
   a first memory configured to buffer first image data input from the first input source; and
   a second memory configured to buffer second image data input from the second input source, wherein
   the camera input interface includes
      a first channel processing circuit configured to perform image processing to the first image data from the first input source,
      a second channel processing circuit configured to perform image processing to the first image data from the first input source, or the second image data from the second input source,
      a selector provided on an input side of the second channel processing circuit and configured to be switched to either one of reading from the first memory and reading from the second memory, and
      a comparator configured to compare a first output result output from the first channel processing circuit and a second output result output from the second channel processing circuit with each other, wherein
   the selector:
      selects a side for reading from the second memory in a first time span performing normal image processing, which is within one frame period; and
      selects a side for reading from the first memory in a second time span performing failure detection processing, which is within the one frame period, in the first time span, the first channel processing circuit performs image processing to the first image data read from the first memory, and the second channel processing circuit performs image processing to the second image data read from the second memory, and, in the second time span, the first channel processing circuit and the second channel processing circuit perform image processing to the first image data.

7. The semiconductor device according to claim 6, wherein, in the first time span, the first channel processing circuit and the second channel processing circuit are set with respective image processing parameters that are arbitrary with respect to each other, and, in the second time span, the first channel processing circuit and the second channel processing circuit are set with respective image processing parameters that are same as each other.

8. The semiconductor device according to claim 7, wherein the first channel processing circuit and the second channel processing circuit perform the normal image processing and the failure detection processing in one frame period.

9. The semiconductor device according to claim 6, wherein the failure detection processing is executed prior to the normal image processing, in the one frame period, and, in the second time span, when the first memory completes storing of for-comparison image data having a predetermined size of the first image data, the first channel processing circuit and the second channel processing circuit perform image processing to the for-comparison image data read from the first memory.

10. The semiconductor device according to claim 6, wherein, in the second time span in which the selector selects the side for reading from the first memory, the comparator compares the first output result and the second output result with each other, and outputs information about agreement or disagreement.

11. A semiconductor device comprising:

a camera input interface processing image data input from a first input source and a second input source;

a first memory; and a second memory, wherein the camera input interface includes a first channel processing circuit configured to perform image processing to first image data from the first input source, and to output a first output result to the first memory, a second channel processing circuit configured to perform image processing to the first image data from the first input source, or second image data from the second input source, and to output a second output result to the second memory, a first selector provided on an input side of the first channel processing circuit and configured to be switched to either one of the first input source and reading from the first memory, a second selector provided on an input side of the second channel processing circuit and configured to be switched to either one of the second input source and reading from the first memory, and a comparator configured to compare the first output result and the second output result with each other, wherein the first selector selects a side for the first input source in a first time span performing normal image processing, which is within one frame period, and selects a side for reading from the first memory in a second time span performing failure detection processing, which is within the one frame period, the second selector selects a side for the second input source in the first time span, and selects a side for reading from the first memory in the second time span, in the first time span, the first channel processing circuit performs image processing to the first image data input from the first input source, and the second channel processing circuit performs image processing to the second image data input from the second input source, and in the second time span, the first channel processing circuit and the second channel processing circuit perform image processing to the first output result read from the first memory.

12. The semiconductor device according to claim 11, wherein, in the first time span, the first channel processing circuit and the second channel processing circuit are set with respective image processing parameters that are arbitrary with respect to each other, and, in the second time span, the first channel processing circuit and the second channel processing circuit are set with respective image processing parameters that are same as each other.

13. The semiconductor device according to claim 12, wherein, in the second time span in which the first selector and the second selector select the side for reading from the first memory, the comparator compares the first output result and the second output result with each other, and outputs information about agreement or disagreement.

14. The semiconductor device according to claim 11, wherein the second time span is a vertical blanking period.

* * * * *